United States Patent [19]
Valentine
[11] Patent Number: 4,529,182
[45] Date of Patent: Jul. 16, 1985

[54] WIDE OPENING GRIPPING JAW ASSEMBLY

[75] Inventor: Al L. Valentine, Southfield, Mich.
[73] Assignee: State Die & Engineering, Inc., Roseville, Mich.

[21] Appl. No.: 483,790
[22] Filed: Apr. 11, 1983
[51] Int. Cl.[3] .......... B23Q 3/08
[52] U.S. Cl. .......... 269/34; 414/753; 294/116; 269/157; 269/239; 269/257
[58] Field of Search .......... 269/24, 32, 34, 58, 269/157, 239, 252, 253, 257; 72/422; 81/301; 294/115, 116; 414/753; 901/37

[56] References Cited

U.S. PATENT DOCUMENTS 2,373,163 4/1945 Cailloux et al. .......... 269/32
3,400,836 9/1968 Bende .......... 294/115
3,425,732 2/1969 Reich .......... 294/115
3,631,989 1/1972 McCormick .......... 901/37

*Primary Examiner*—Frederick R. Schmidt
*Assistant Examiner*—Judy J. Hartman
*Attorney, Agent, or Firm*—Krass & Young

[57] ABSTRACT

A fluid driven piston and cylinder includes a pair of wide opening jaws for gripping relatively thick workpieces. The jaws are mounted on a head which is linearly displaceable by a piston rod powered by the piston and cylinder. An actuating plate on the head actuates closure of the jaws when the head reaches its maximum outward position of displacement. The actuating plate displaces a U-shaped yoke reciprocably mounted on the head. The jaws are pivotally mounted on the head and are squeezed into gripping relationship to a workpiece by rollers mounted on the extremities of the yoke.

16 Claims, 6 Drawing Figures

WIDE OPENING GRIPPING JAW ASSEMBLY

DESCRIPTION

TECHNICAL FIELD

The present invention broadly relates to gripping and clamping apparatus, especially that of the power operated type, and deals more particularly with a gripping jaw assembly wherein the jaws may be opened widely to accommodate thick workpieces.

BACKGROUND ART

Various types of power operated clamping and gripping apparatus have been devised in the past for gripping and manipulating workpieces in industrial applications. Because of the increasing use of robotic devices in industry, it is necessary that clamping and gripping apparatus be versatile and suited for use in various applications.

Known prior art gripping and clamping apparatus normally include a pair of gripping jaws, at least one of which is movable relative to the other from an open position to a closed, clamping position. In some applications, it is necessary that the jaws be able to open to a widely spaced position so as to approach and clamp particularly thick workpieces, some of which are relatively heavy. Many of the known prior art apparatus are not suited for these applications, either because the jaws will not open sufficiently wide to accommodate the workpiece or lack the clamping power to securely hold the workpiece even if it can be gripped.

Complicating the design of a suitable gripping and clamping apparatus having wide opening jaws is the need for mounting the jaws on robotic apparatus for reciprocating movement so as to allow several degrees of freedom of movement of the workpiece.

The present invention provides a wide opening gripping jaw assembly which overcomes each of the deficiencies inherent in the prior art devices discussed above. It is therefore a primary object of the present invention to provide a gripping jaw assembly having jaws which may be widely opened to accommodate and grip relatively thick workpieces.

A further object of the invention is to provide a gripping jaw assembly as described above which is capable of imposing a relatively high clamping force on the workpiece.

A still further object of the invention is to provide a gripping jaw assembly as described above which may be reciprocably mounted for movement toward and away from a workpiece.

Another object of the invention is to provide a gripping jaw assembly as described immediately above in which the jaws may be actuated by a piston rod which also reciprocates the jaw assembly.

These, and further objects of the present invention will be made clear or will become apparent during the course of the following description of a preferred embodiment of the present invention.

DISCLOSURE OF THE INVENTION

According to the present invention, a gripping jaw assembly actuated by a fluid driven piston and cylinder includes a pair of wide opening jaws adapted to grip a relatively thick workpiece. The jaws are mounted on a head which is linearly displaceable by a piston rod powered by the piston and cylinder. An actuating plate on the head actuates closure of the jaws when the head reaches its maximum outward position of displacement. The actuating plate displaces a yoke which is reciprocably mounted on the head. The jaws include elongate mounting arms pivotally connected to the head between the extremities of the yoke. The yoke includes a pair of rollers which engage and squeeze together the arms of the jaws to effect closing of the jaws. Links connnected between the ends of the yoke and the jaw arms force the jaws apart when the yoke shifts to a released position.

BRIEF DESCRIPTION OF THE DRAWINGS

In the drawings, which form an integral part of the specification and are to be read in conjunction therewith, and in which like reference numerals are employed to designate identical components in the various views.

BEST MODE FOR CARRYING OUT THE INVENTION

Figure 1:
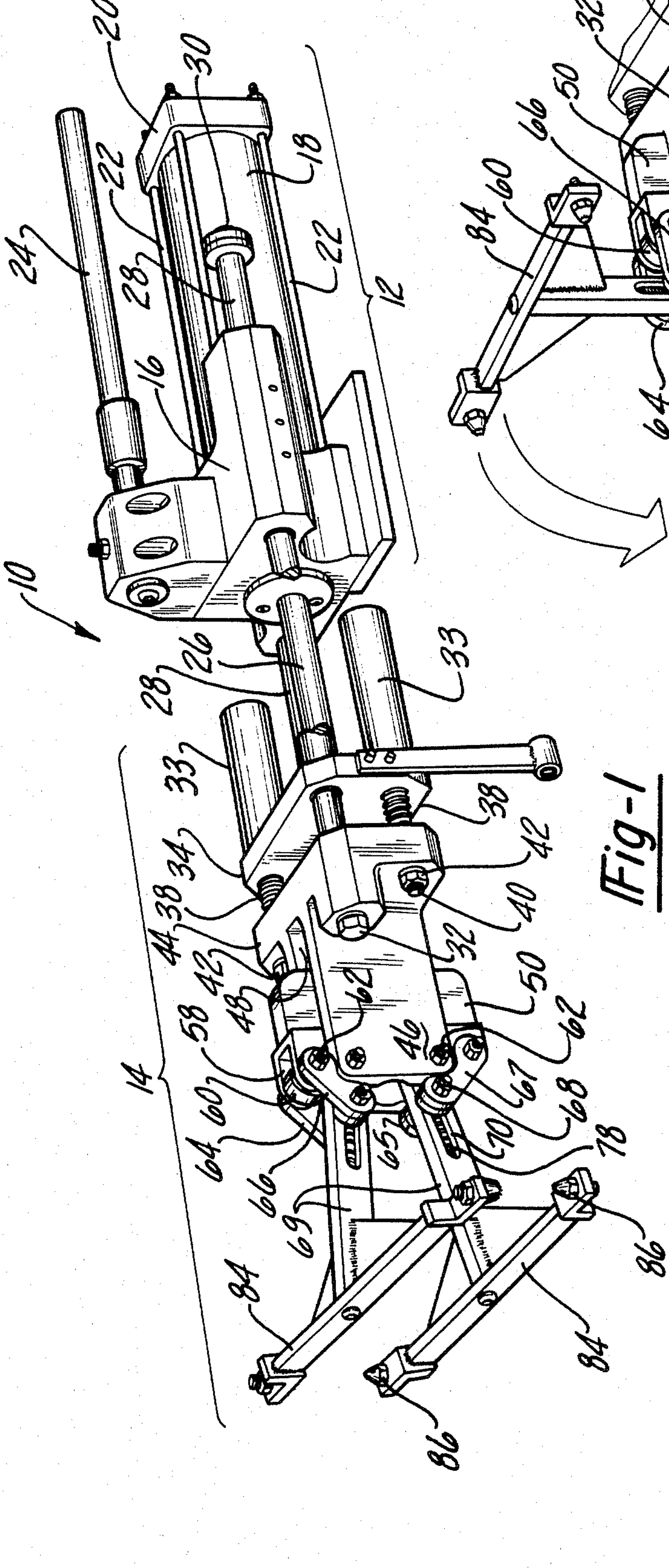
FIG. 1 is a perspective view of a wide opening gripping jaw assembly which forms the preferred embodiment of the present invention, the jaws being shown in a partially closed position.

Referring to the drawings, a wide opening gripping jaw assembly generally indicated by the numeral 10 broadly includes a motor assembly 12 and a gripping mechanism 14. Motor assembly 12 includes a body 16 adapted to be mounted on a support or robotic device (not shown) by means of a mounting rod 24. Body 16 includes a central aperture therein within which there is mounted one end of a cylinder 18. The other end of cylinder 18 is closed by an end caps 20 which is drawn into fluid tight engagement with the end of the cylinder 18 by means of tie rods 22. A piston 54 is reciprocably mounted within the cylinder 18 and is driven by a source of pressurized fluid such as a pneumatic source 56 which delivers fluid into either end of the cylinder 18. A drive shaft or piston rod 36 has one end thereof secured to piston 54 and extends through the front of body 16. The other end of shaft 36 is drivingly connected to an actuating plate 34 so as to both linearly displace and actuate the gripping mechanism 14, as will be discussed later in more detail.

The gripping mechanism 14 is slidably mounted on body 16 by means of a pair of guide rods 28 which are slidably received within apertures in the body 16 and include stops 30 on one end thereof which are adapted to engage the body 16 when the gripping mechanism 14 is in its fully extended position. Rods 28 are disposed on opposite sides of shaft 36 and extend through spaced apart apertures in actuating plate 34, the other ends of rods 28 being secured to a mounting head 44 by means of bolts 32. Actuating plate 34 is freely slidable on rods 28. It may therefore be appreciated that rods 28 not only reciprocably mount and guide the gripping mechanism 14 for sliding movement but also prevent rotation thereof about shaft 36.

The outer end of shaft 36 includes a reduced diameter portion 35 which extends through the actuating plate 34 and defines a shoulder 31 which engages and seats against one side of actuating plate 34. The reduced diameter portion 35 is secured to an elongate connecting member 37 which is slidably received within and guided by a pair of spaced apart, parallel plates 46 which form a portion of mounting head 44. Means for normally biasing the actuating plate 34 to shift away from the mounting head 44 comprise springs 38 trapped within bosses 33 which extend rearwardly from and are secured to actuating plate 34. One end of the springs 38 engage the outer end of bosses 33 while the opposite ends thereof bear against the adjacent face of mounting head 44. A pair of elongate guides 40 secured to mounting head 44 by nuts 42 extend into the springs 38 and bosses 33, thereby maintaining springs 38 in longitudinal registration during shifting of actuating plate 34 toward and away from mounting head 44.

Plates 46 are spaced apart to form an opening 48 within which there is slidably confined a U-shaped yoke 50. The bight of the yoke 50 is secured to the outer end of connecting member 37 such that displacement of connecting member 37 likewise displaces yoke 50 longitudinally back and forth between plates 46. The outer ends of the legs of yoke 50 are bifurcated at 58 so as to receive a roller 60 therebetween. A bolt and nut 62, journal the rollers 60 for rotation within the bifurcated portions 58 and also pivotally mout one end of respectively associated pairs of links 64,66 and 65,67 for pivotal movement on the respectively associated legs of the yoke 50.

Figure 5:
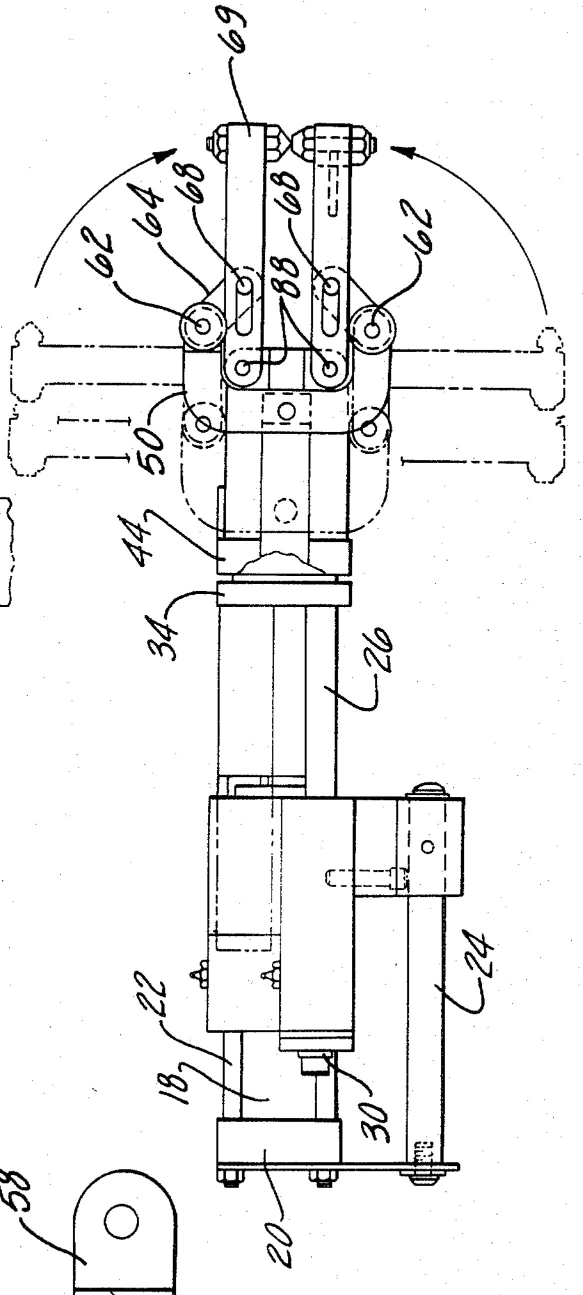
FIG. 5 is a side view of the assembly shown in FIG. 1 but with the jaws in a closed position, the position of the jaws and yoke in the fully open position thereon being indicated in the phantom; and, FIG. 6 is a side view of a portion of the mounting head and the jaws having a workpiece clamped therebetween, the partially open position of one of the jaws being indicated in the phantom.

A pair of generally T-shaped gripping members 84 having gripping teeth 86 are pivotally mounted on head 44 by means of elongate arms 69. One end of arms 69 are pivotally mounted by means of a bolt and nut 88 to the outer extremities of plates 46. The pivot points for gripping jaws 84 on mounting head 44 are therefore spaced inboard of the outer extremities of the legs of yoke 50, as best seen in FIG. 5. Each of the arms 69 is provided with an elongate slot 70 therein near the outer end thereof adjacent the pivot points 88. The other ends of links 64,66 and 65,67 are slidably and pivotally connected within the associated slots 70 by means of corresponding bolts 68 which extend transversely through the slots 70. Compression springs 78 captured within the slots 70 bear against a head 82 of a guide rod 80. Head 82 seats against the bolt 68 and therefore biases the bolt 68 to shift toward the inner end of the slot 70. As best seen in FIG. 5, the rollers 60 are respectively disposed immediately on the outer sides of arms 69 so as to engage and bear against arms 69 during actuation of the jaws, as will be discussed hereinbelow.

Figure 2:
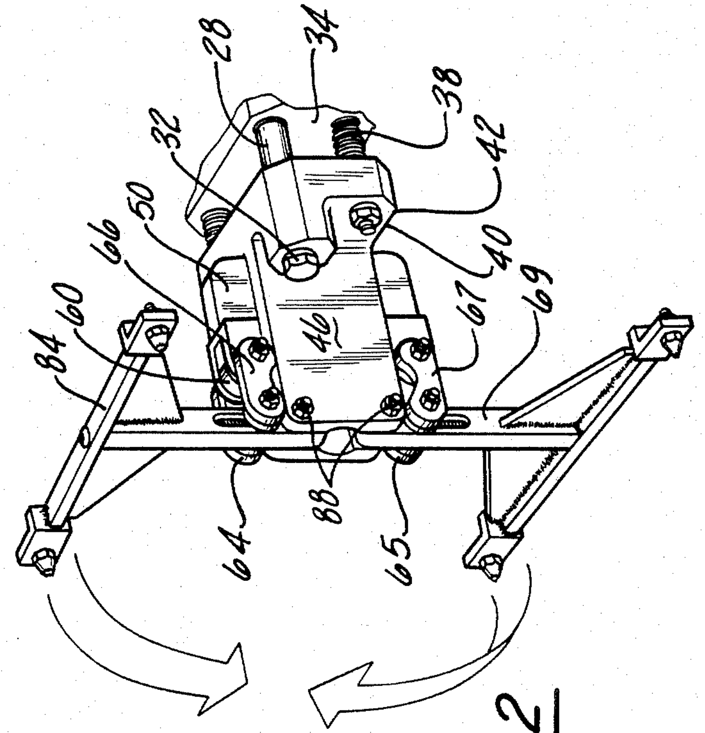
FIG. 2 is a perspective view of the mounting head, showing the jaws in a fully open position.
Figure 3:
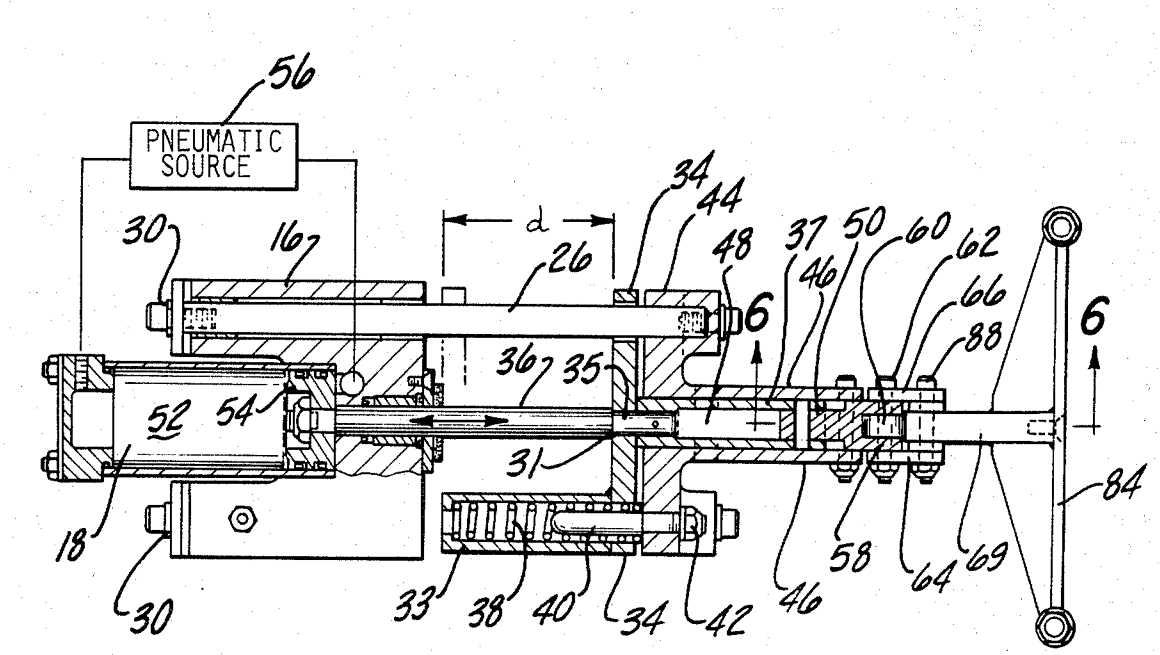
FIG. 3 is a top view of the assembly shown in FIG. 1, parts being broken away in section for clarity.
Figure 4:
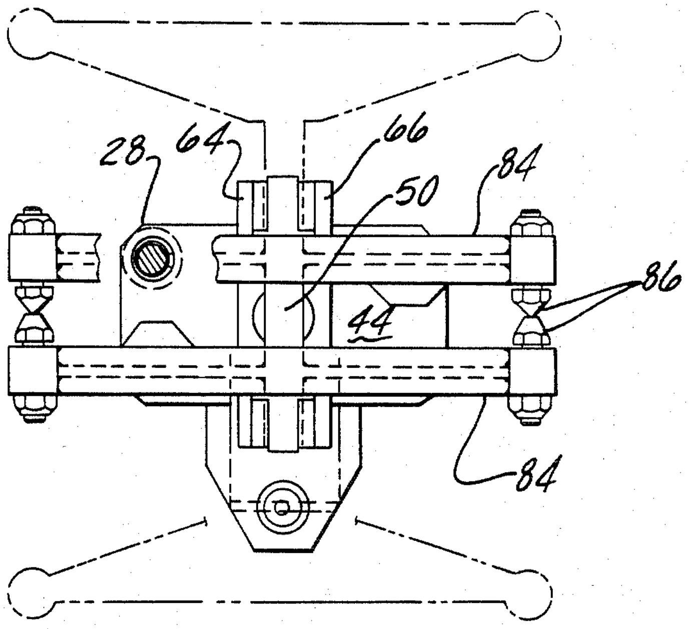
FIG. 4 is a front view of the mounting head showing the jaws in a fully closed position, the fully open position of the jaws being indicated in the phantom.
Figure 6:
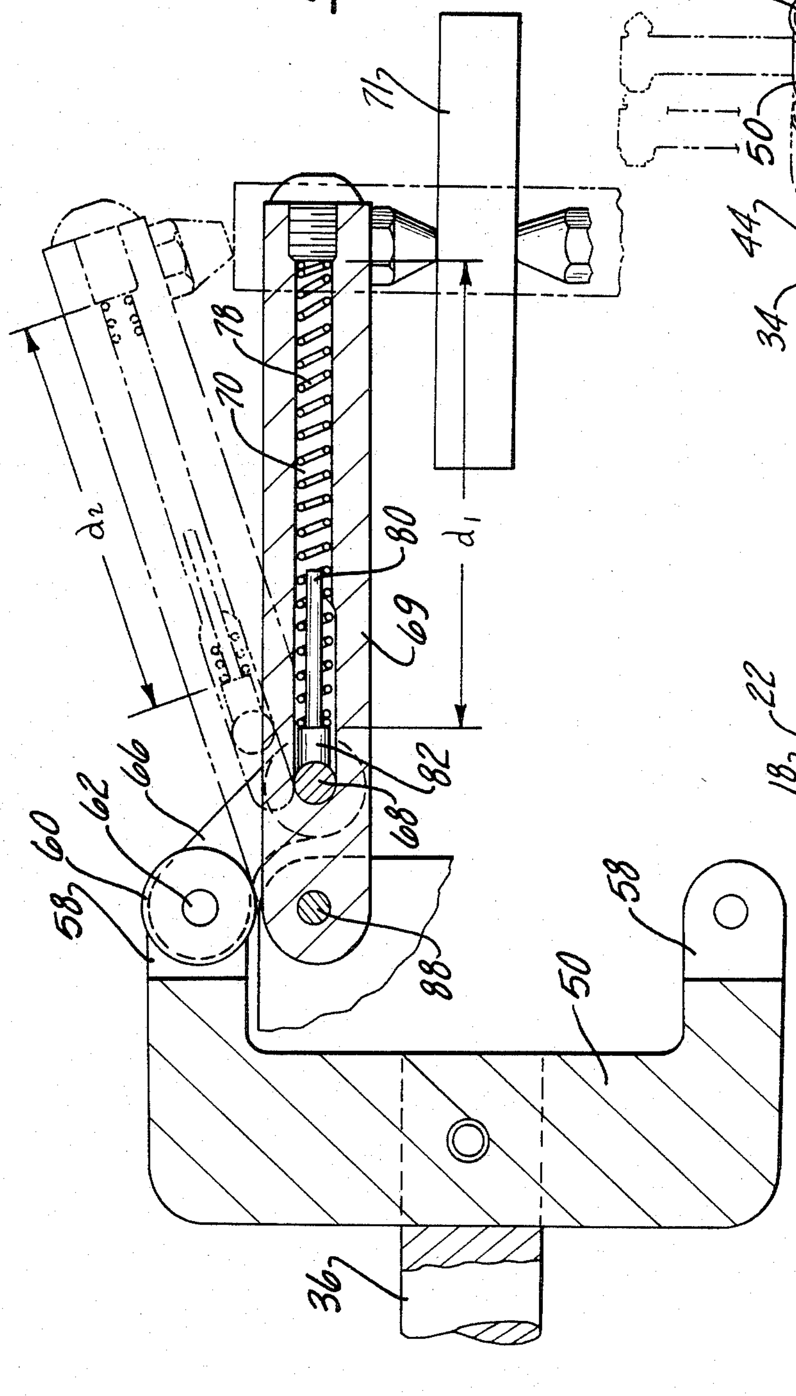

In operation, the biasing influence of springs 38 normally forces actuating plate 34 away from mounting head 44, thereby drawing the yoke 50 rearwardly within the space 48 to a retracted position. With the yoke 50 in the retracted position, the jaws 84 are in a fully open position as shown in FIG. 2 with the links 64,66 and 65,67 in clearing relationship to the sides of plates 46. The gripping mechanism remains in this condition until actuation thereof takes place when the mechanism 14 reaches its maximum outward displacement relative to the body 16. Pressurized fluid from the source 56 drives the piston 54, which in turn extends or retracts shaft 36. As shaft 36 is extended, the shoulder 31 bears against actuating plate 34 thus forcing the entire gripping mechanism 14 outwardly, and, as previously mentioned, rods 28 both guide and prevent rotation of the gripping mechanism 14 about shaft 36. Actuating plate 34 remains in spaced relationship to mounting head 44 until the gripping mechanism 14 reaches its maximum outward displacement whereupon stops 30 engage mounting head 16 thereby preventing any further outward displacement of mounting head 44. The stroke of the piston 54 is such that shaft 36 continues to travel outwardly after stops 30 engage body 16, thereby overcoming the biasing influence of springs 38 and forcing actuating plate 34 toward mounting head 44. Displacement of actuating plate 34 is transmitted through connecting member 37 to the yoke 50, thus displacing yoke 50 outwardly while head 44 remains stationary. As yoke 50 is displaced outwardly, rollers 60 engage arms 69 thereby squeezing or forcing the jaws 84 to pivot toward each other into clamping relationship to the workpiece 71. As the rollers 60 are displaced into overriding relationship to the arms 69, the force from yoke 50 transmitted through the links 64,66 and 65,67 overcome the biasing influence of springs 78, thus forcing the bolts or pivot points 68 to slide forwardly within arms 69. With the yoke 50 in a fully extended position, as shown in FIG. 5, the arms 69 are locked against outward pivotal movement, thus firmly locking the jaws 84 in clamping relationship to the workpiece 71. In order to release the workpiece, piston 54 is retracted a distance corresponding to the normal spacing between actuating plate 34 and mounting head 44, whereupon the biasing influence of springs 38 forces actuating plate 34 rearwardly to retract the yoke 50 into clearing relationship to the arms 69. As yoke 50 retracts to its starting position, links 64,66 and 65,67 cause arms 69 to pivot outwardly away from each other, thereby opening jaws 84 to their fully open position. The length of links 64,66 and 65,67 determine the maximum angular opening between the jaws 84 when the latter are in their open position.

From the foregoing, it is apparent that the gripping jaws assembly described above not only provides for the reliable accomplishment of the objects of the invention, but does so in a particularly economical and efficient manner. It is recognized, of course, that those skilled in the art may make various modifications or additions to the preferred embodiment choosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. A gripping apparatus comprising:

A. a power shaft having a forward stroke;

B. an actuating member drivingly engaged with said shaft so as to be moved forwardly therewith;

C. a mounting head carried by and positioned forwardly of said actuating member so that said actuating member and mounting head are moved forwardly together upon movement of said shaft through its forward stroke;

D. spring means normally maintaining said mounting head in forwardly spaced relation to said actuating member;

E. a pair of normally open opposed clamping jaws pivotally mounted to spaced points on the forward end of said mounting head;

F. means operative in response to forward movement of said actuating member and mounting head by said shaft through a distance less than said forward stroke to stop further forward movement of said mounting head so that, as said shaft moves forwardly through the remainder of its forward stroke, said actuating member closes up on said mounting head against the resistance of said spring means; and G. means operative in response to such continued forward stroking movement of said shaft to move said jaws to a closed, gripping position.

2. The apparatus of claim 1, wherein said operative means includes a yoke drivingly connected to a forward end of said shaft and a pair of link members each having one end thereof pivotally connected to a respective end of said yoke and the other end thereof pivotally connected to a respective jaw.

3. The apparatus of claim 2, wherein the other end of each of said links is pivotally and slideably mounted on one jaw.

4. The apparatus of claim 3, wherein each of said jaws includes a slot therein and said other end of each of said links is slidably confined in said slot.

5. Gripping apparatus comprising:

A. a fluid operated piston and cylinder assembly including an extensible output shaft;

B. a mounting head carried on the end of said shaft and movable upon extension of said shaft between a retracted position opposite said piston and cylinder assembly and an extended position;

C. a pair of opposed gripping jaws adapted to grip a workpiece therebetween;

D. a yoke connected to said opposite end of said shaft and mounted on said mounting head for reciprocal movement relative to said mounting head;

E. means on said yoke for engaging said jaws and forcing said jaws toward and away from each other in response to reciprocal movement of said yoke on said mounting head;

F. an actuating plate drivingly connected with said shaft;

G. a connecting member connected between said yoke and said actuating plate for reciprocating said yoke in one direction relative to said mounting head upon extension of said shaft; and H. means for normally biasing said yoke for reciprocal movement relative to said mounting head in the other direction.

6. The apparatus of claim 5, wherein said gripping apparatus further includes means slidably mounting said actuating plate on said mounting head.

7. Power operated clamping apparatus, comprising:

motor means having an extensible output shaft;

a body having said motor means mounted thereon;

a pair of guide rods slidably mounted at one end thereof on said body including stop means for limiting sliding displacement of said rods away from said body;

a mounting head secured to the other ends of said rods distal from said body for movement with said rods;

a U-shaped yoke secured to the end of said shaft opposite said motor means and displaceable relative to said head away from said body upon continued extensible movement of said shaft after said head reaches its maximum displacement from said body as defined by said stop means;

means for normally biasing said yoke to shift relative to said head toward said body;

a pair of clamping members pivotally mounted on said head for pivotal movement toward and away from each other; and means on each end of said yoke operative to force said clamping member toward each other in response to displacement of said yoke relative to said head toward said body.

8. The apparatus of claim 7, wherein:

said head includes a pair of spaced apart plates on opposite lateral sides of said yoke for guiding displacement of said yoke relative to said head;

said clamping members each have on extremity thereof pivotally mounted between said plates, and there is further provided link means including a pair of links respectively associated with said clamping members, one each of each of said links being pivotally connected to a respective extremity of said yoke, the other end of each of said links being pivotally connected to a respective one of said clamping members intermediate the opposite extremities of the respective clamping member.

9. The apparatus of claim 8, wherein said engaging means includes a pair of rollers respectively mounted on said ends of said yoke, and each of said clamping members includes an elongate surface along which a respective roller rides.

10. The apparatus of claim 9, wherein each of said clamping members includes an elongate arm, said elongate surfaces being respectively defined on said arms, one extremity of said arms being pivotally mounted on said head between said ends of said yoke.

11. The apparatus of claim 10, wherein each of said arms includes a slot therein, said other end of each of said links being slidably confined within a respective slot.

12. Apparatus for clamping a workpiece comprising:

a body;

a rigid yoke mounted on said body for reciprocation between a standby position and an actuated position;

first means connected with said yoke for reciprocating said yoke on said body;

a pair of opposed clamping arms for clamping said workpiece therebetween, said clamping arms being pivotally mounted on said body;

a pair of rollers journaled on said yoke at spaced locations on said yoke for respectively drivingly engaging said clamping arms, said rollers being operative to pivot said clamping arms to a closed position clamping said workpiece therebetween in response to movement of said yoke from said standby position thereof to said actuated position thereof; and means connected between said yoke and each of said clamping arms operative to pivot said clamping arms to an open position releasing said workpiece in response to movement of said yoke from said actuated position thereof to said standby position thereof.

13. The apparatus of claim 12, wherein said connected means includes a pair of link mechanisms, each of said link mechanisms including a link having first and second ends, said first end being pivotally connected to said yoke, said second end being slidably connected to a respective clamping arm.

14. Power operated clamping apparatus comprising:
motor means having an extensible output shaft;
a body having said motor means mounted thereon;
a pair of guide rods slidably mounted at one end thereof on said body including stop means for limiting sliding displacement of said rods away from said body;
a mounting head secured to the other ends of said rods distal from said body for movement with said rod;
a U-shaped yoke secured to the end of said shaft opposite said motor means and displaceable relative to said head away from said body upon continued extensible movement of said shaft after said head reaches its maximum displacement from said body as defined by said stop means;
a plate member slidably mounted on said rods;
spring means interposed between said head and said plate member;
a pair of clamping members pivotally mounted on said head for pivotal movement toward and away from each other; and
means on each end of said yoke operative to force said clamping members toward each other in response to displacement of said yoke relative to said head toward said body.

15. Apparatus for clamping a workpiece comprising:
a body;
a rigid yoke mounted on said body for reciprocation between a standby position and an actuated position;
first means connected with said yoke for reciprocating said yoke on said body;
a pair of opposed clamping arms for clamping said workpiece therebetween, said clamping arms being pivotally mounted on said body;
a pair of rollers journaled on said yoke at spaced locations on said yoke for respectively drivingly engaging said clamping arms, said rollers being operative to pivot said clamping arms to a closed position clamping said workpiece therebetween in response to movement of said yoke from said standby position thereof to said actuated position thereof; and
means connected between said yoke and each of said clamping arms operative to pivot said clamping arms to an open position releasing said workpiece in response to movement of said yoke from said actuated position thereof to said standby position thereof, said connected means including a pair of link mechanisms, each of said link mechanisms including a link having first and second ends with said first end of each link pivotally connected to said yoke and said second end of each link slidably connected to a respective clamping arm, each of said link mechanisms including means for normally biasing said second end of each link to slide in one direction on a respective clamping arm.

16. The apparatus of claim 15, wherein said roller means includes a pair of rollers mounted on the opposite ends of said yoke, said yoke respectively engaging and transmitting force to said clamping arms when said yoke shifts from said standby position thereof to said actuated position thereof.

* * * * *